US011421557B1

(12) United States Patent
Alstad et al.

(10) Patent No.: US 11,421,557 B1
(45) Date of Patent: Aug. 23, 2022

(54) TURBOMACHINE COMPONENTS INCLUDING CASTELLATION FLANGES AND METHODS FOR COUPLING TURBOMACHINE COMPONENTS

(71) Applicant: HONEYWELL INTERNATIONAL INC., Charlotte, NC (US)

(72) Inventors: Shawn Alstad, Phoenix, AZ (US); Laurence D. N. Liston, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/444,998

(22) Filed: Aug. 13, 2021

(51) Int. Cl.
*F01D 25/24* (2006.01)
*F16L 23/02* (2006.01)
*F16D 1/00* (2006.01)
*F01D 25/00* (2006.01)

(52) U.S. Cl.
CPC ......... *F01D 25/243* (2013.01); *F01D 25/005* (2013.01); *F16D 1/00* (2013.01); *F16L 23/02* (2013.01); *F05D 2230/64* (2013.01); *F05D 2240/14* (2013.01); *F05D 2250/192* (2013.01); *F05D 2250/232* (2013.01); *F05D 2250/73* (2013.01); *F05D 2260/31* (2013.01); *F05D 2300/432* (2013.01)

(58) Field of Classification Search
CPC ...... F01D 25/24; F01D 25/243; F01D 25/246; F01D 25/265; F01D 11/08; F05D 2230/64; F05D 2260/31; F05D 2260/36; F16L 23/00; F16L 23/024; F16L 23/028; F16L 23/0283; F16L 23/032; F16L 23/036; F16D 1/033; F16D 1/076; E04H 12/085; Y10T 403/64; Y10T 403/335
See application file for complete search history.

(56) References Cited

U.S. PATENT DOCUMENTS

| | | | | |
|---|---|---|---|---|
| 5,737,913 | A | 4/1998 | Terry | |
| 8,104,799 | B2 * | 1/2012 | Huskamp | B28B 1/00 285/402 |
| 10,669,877 | B2 | 6/2020 | Cigal | |
| 2014/0286770 | A1 * | 9/2014 | Henry | F01D 5/026 415/213.1 |
| 2020/0072054 | A1 | 3/2020 | Laroche | |
| 2020/0141280 | A1 * | 5/2020 | Kusakabe | F01D 25/16 |

FOREIGN PATENT DOCUMENTS

| | | | | |
|---|---|---|---|---|
| WO | 2016032515 | A1 | 3/2016 | |
| WO | WO-2016032515 | A1 * | 3/2016 | F01D 25/243 |

* cited by examiner

*Primary Examiner* — Christopher Verdier
*Assistant Examiner* — Maxime M Adjagbe
(74) *Attorney, Agent, or Firm* — Lorenz & Kopf, LLP

(57) ABSTRACT

Turbomachines and methods for coupling first and second turbomachine components are provided. The components include castellated flange arrangements that provide an improved retention method for retaining the components that is far superior in than bolts and nuts, especially for massive unbalance loading.

20 Claims, 12 Drawing Sheets

242
242
242
506
512
402
222
504
218

TURBOMACHINE COMPONENTS INCLUDING CASTELLATION FLANGES AND METHODS FOR COUPLING TURBOMACHINE COMPONENTS

TECHNICAL FIELD

The present disclosure generally relates to turbomachines, and more particularly relates to turbomachine components that include castellation flanges and methods for coupling those turbomachine components.

BACKGROUND

Turbomachines, such as gas turbine engines, include various components that are typically coupled together via interface flanges and hardware. For example, in the context of a turbofan gas turbine propulsion engine, components such as the inlet, fan containment housing, front frame, forward outer bypass duct, aft outer bypass duct, and thrust reverser are typically connected using bolts that extend through openings in the mating interface flanges formed on the components, and a nut that is threaded on each of the bolts.

In many instances, each turbomachine component has multiple flanges. For example, some turbomachine components can have in the range of 30-36 interface flanges. As may be appreciated, a relatively large amount of time can be associated with installing 30-36 bolts and nuts at each interface flange. This time can then stack up across the multiple components that need to be attached.

Moreover, in the context of thrust reversers, current interface flange arrangements can limit the amount of thrust reverser clocking. For example, when adjacent components each include 36 interface flanges (and openings), thrust reverser clocking is limited to 10-degree increments (i.e., 360°/36 openings). Such limitations may be undesirable for some turbofan engine configurations.

Hence, there is a need for turbomachine components and methods for coupling turbomachine components that does not require a relatively large amount of time installing fastener hardware at each mating interface flange and/or does not limit the clocking of certain components, such as thrust reverser components. The present invention addresses one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a turbomachine includes a first component and a second component. The first component extends about an axis of symmetry from a first component mating end to an opposing first component second end. The first component has a plurality of internal attachment flanges spaced evenly around the first component mating end, and each internal attachment flange includes a first component flange section and a mating section coupled to the first component flange section. Each first component flange section extends radially from the first component mating end and is disposed perpendicular to the axis of symmetry, and each mating section is spaced apart from the first component mating end and extends parallel to the axis of symmetry. The second component extends about the axis of symmetry from a second component mating end to an opposing second component second end. The second component is coupled to the first component and has a plurality of external attachment flanges spaced evenly around the second component mating end. Each external attachment flange includes a second component flange section and a receptacle section. Each second component flange section extends radially from the second component mating end and is disposed perpendicular to the axis of symmetry. Each receptacle section includes a first arm, a second arm, and a third arm that is connected to the first and second arms. The first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections. The mating section of each internal attachment flange is associated with, and is disposed within, the receptacle section cavity of a different one of the external attachment flanges, to thereby define a plurality of mating flange pairs, and a subset of the mating flange pairs each includes an anti-rotation feature, to thereby define a plurality of anti-rotation mating flange pairs.

In another embodiment, a turbomachine includes a first component and a second component. The first component extends about an axis of symmetry from a first component mating end to an opposing first component second end. The first component has a plurality of internal attachment flanges spaced evenly around the first component mating end, and each internal attachment flange includes a first component flange section and a mating section coupled to the first component flange section. Each first component flange section extends radially from the first component mating end and is disposed perpendicular to the axis of symmetry, and each mating section is spaced apart from the first component mating end and extends parallel to the axis of symmetry. The second component extends about the axis of symmetry from a second component mating end to an opposing second component second end. The second component is coupled to the first component and has a plurality of external attachment flanges spaced evenly around the second component mating end. Each external attachment flange includes a second component flange section and a receptacle section. Each second component flange section extends radially from the second component mating end and is disposed perpendicular to the axis of symmetry. Each receptacle section includes a first arm, a second arm, and a third arm that is connected to the first and second arms. The first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections. Each mating section is associated with, and is disposed within, the receptacle section cavity of a different one of the external attachment flanges, to thereby define a plurality of mating flange pairs. A subset of the mating flange pairs each includes an anti-rotation feature, to thereby define a plurality of anti-rotation mating flange pairs. Each anti-rotation mating flange pair has fastener hardware that extends therethrough, and the plurality of anti-rotation mating flange pairs are spaced asymmetrically about the axis of symmetry.

In yet another embodiment, a method of coupling together two turbomachine components includes providing a first component and a second component. The first component extends about an axis of symmetry from a first component mating end to an opposing first component second end. The first component has a plurality of internal attachment flanges spaced evenly around the first component mating end. Each internal attachment flange includes a first component flange section and a mating section coupled to the first component flange section. Each first component flange section extends radially from the first component mating end and is disposed perpendicular to the axis of symmetry. Each mating section is spaced apart from the first component mating end and extending parallel to the axis of symmetry, and a first subset of the internal attachment flanges each include a first anti-rotation feature. The second component extends about the axis of symmetry from a second component mating end to an opposing second component second end. The second component has a plurality of external attachment flanges spaced evenly around the second component mating end. Each external attachment flange includes a second component flange section and a receptacle section. Each second component flange section extends radially from the second component mating end and is disposed perpendicular to the axis of symmetry. Each receptacle section includes a first arm, a second arm, and a third arm that is connected to the first and second arms. The first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections. A second subset of the external attachment flanges each include a second anti-rotation feature. The first component mating end and the second component mating end are abutted in a manner that (i) each internal attachment flange is radially disposed between two adjacent external attachment flanges and (ii) each internal attachment flange that includes a first anti-rotation feature is radially disposed adjacent one of the external attachment flanges that includes a second anti-rotation feature, and relative rotation is provided between the first component and the second component until the mating section of each internal attachment flange is disposed within the receptacle section cavity of one of the two adjacent external attachment flanges, and such that each of the first anti-rotation features is aligned with a different one of the second anti-rotation features.

Furthermore, other desirable features and characteristics of the turbomachine and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
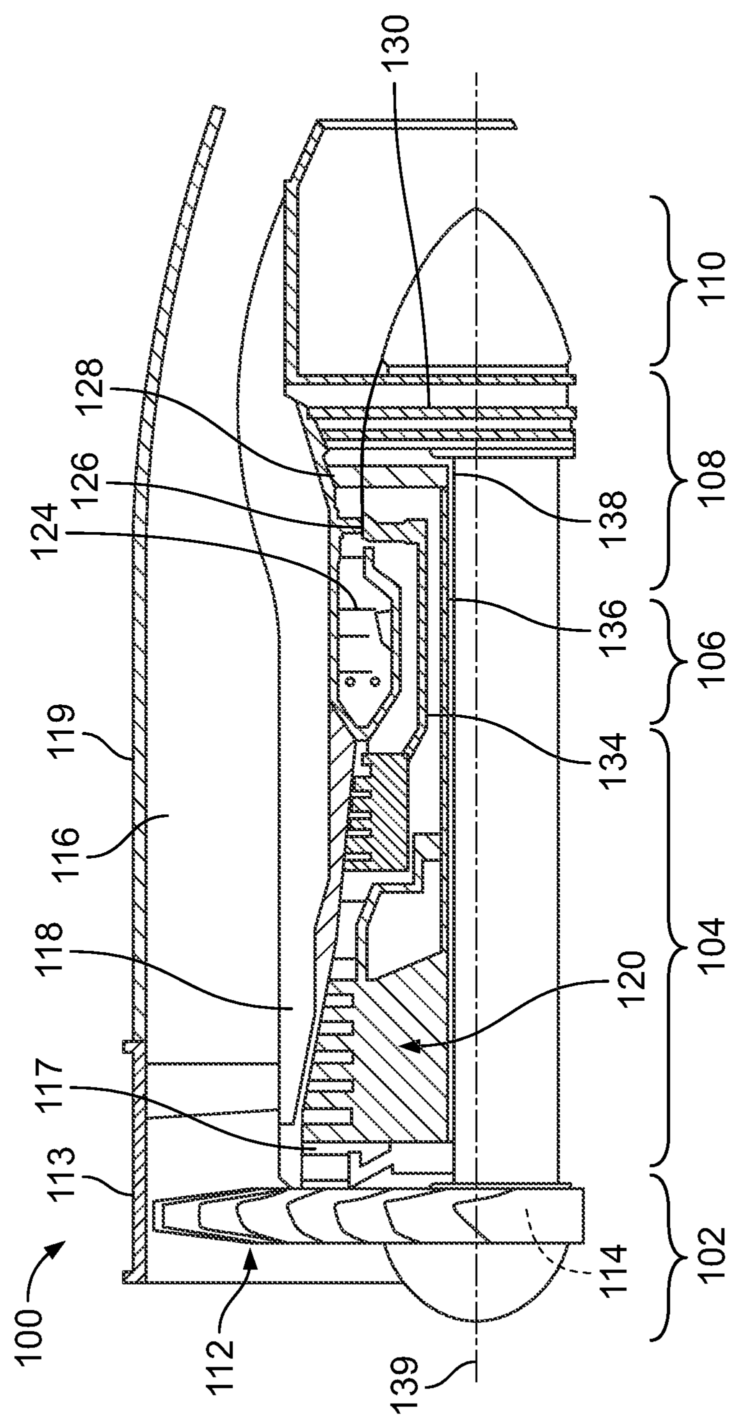
FIG. 1 depicts a partial, cross-sectional view of one example of a turbomachine.

With reference first to FIG. 1, a partial, cross-sectional view of one example of a turbomachine 100 is depicted. The depicted portion of the turbomachine 100 is illustrated as being substantially axisymmetric about a longitudinal axis 139, which also comprises an axis of rotation for the turbomachine 100. In the depicted embodiment, the gas turbine engine 100 is an annular multi-spool turbofan gas turbine jet engine and, for completeness, will be briefly described. Before doing so, however, it is noted that the more detailed descriptions of turbomachine components and coupling methods described herein are not limited to turbofan gas turbine engines, but may be applied to numerous other types of turbomachine types including, but not limited to, gas turbine engines included with auxiliary power units, turboprop, turboshaft, and turbojet engines, whether deployed onboard an aircraft, watercraft, or ground vehicle (e.g., a tank), included within industrial power generators, or utilized within another platform or application.

With the above in mind, the depicted turbomachine 100 includes a fan section 102, a compressor section 104, a combustor section 106, a turbine section 108, and an exhaust section 110. The fan section 102 includes a fan 112 that draws air into the gas turbine engine 100, via an inlet 113 (which may comprise a non-illustrated fan containment housing), and accelerates the air. A fraction of the accelerated air exhausted from the fan 112 is directed through an outer bypass duct 116 and the remaining fraction of air exhausted from the fan 112 is directed into the compressor section 104 along a core flow path 117. The outer bypass duct 116 is generally defined between the inner casing 118 and an outer casing 119, which may comprise non-illustrated forward and aft outer bypass ducts. The compressor section 104 includes one or more stages 120, which will be discussed in greater detail below. The compressor section 104 sequentially raises the pressure of the air and directs a majority of the high-pressure air into the combustor section 106.

In the combustor section 106, which includes a combustion chamber 124, the high-pressure air is mixed with fuel, which is combusted. The high-temperature combustion air is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high-pressure turbine 126 and the intermediate pressure turbine 128 drives the stages 120 in the compressor section 104 via shafts 134, 136, and the low-pressure turbine 130 drives the fan 112 via a shaft 138.

As noted previously, various components that comprise the turbomachine 100 are coupled together. For example, portions of the fan section 102 may be coupled to the compressor section 104, portions of the compressor section 104 may be coupled to the combustor section 106, and portions of the compressor section 106 may be coupled to the turbine section 108, just to name a few of the turbomachine components that are coupled together. One example of two turbomachine components—a first component 202 and a second component 204—that are coupled together according to the configuration and methods described herein is depicted in FIGS. 2-9. Before proceeding further, however, it is noted that although the turbomachine components are referenced herein as first and second components 202, 204, these components may be any one of numerous components that comprise the turbomachine 100.

Figure 2:
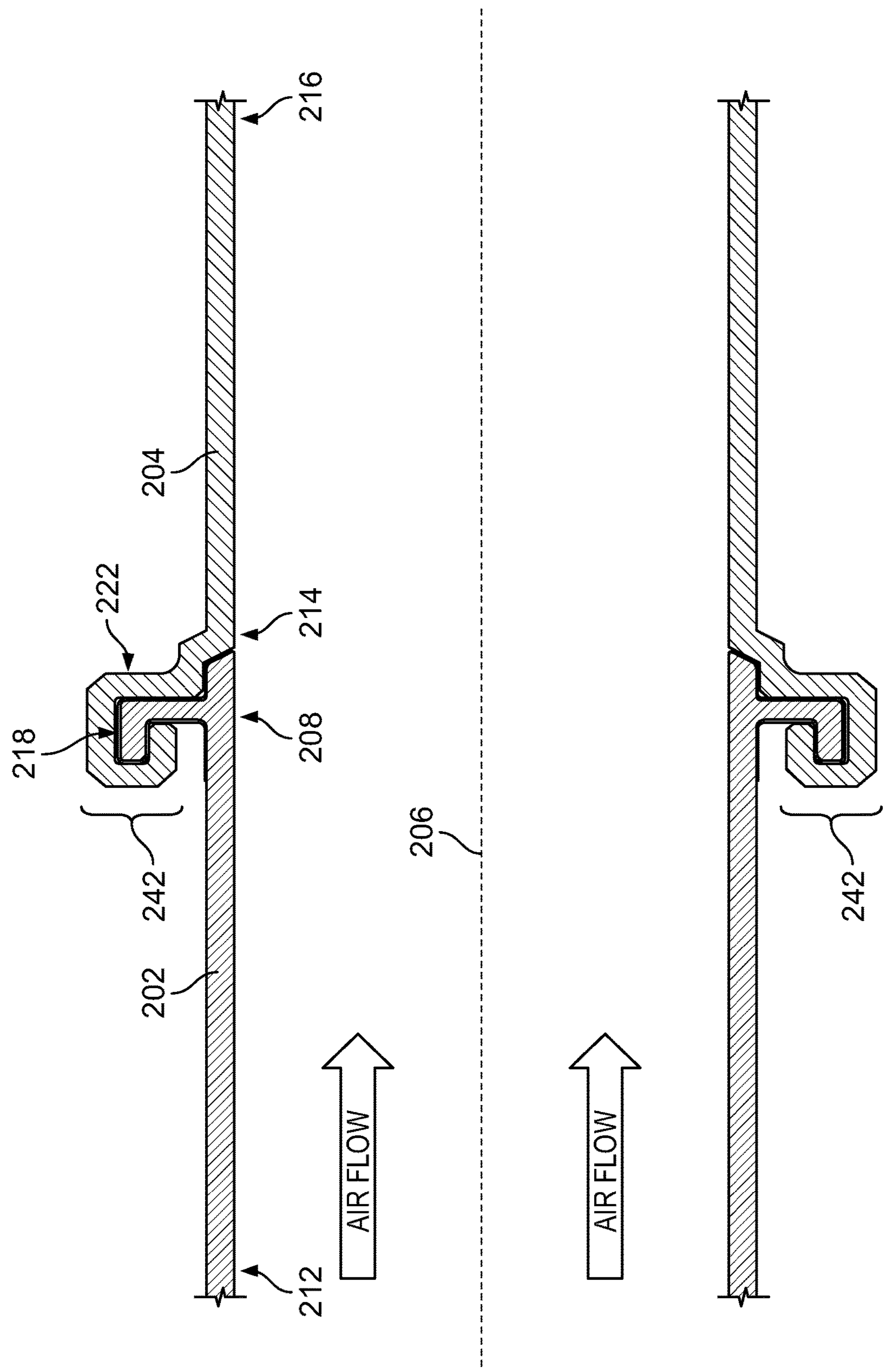
FIG. 2 depicts a cross-sectional view of one example of two turbomachine components that may comprise the turbomachine of FIG. 1 being coupled together.

As shown in FIG. 2, the first component 202 extends about an axis of symmetry 206 (which may correspond to the longitudinal axis 139 of FIG. 1) from a first component mating end 208 to an opposing first component second end 212. The second component 204 also extends about the axis of symmetry 206, but from a second component mating end 214 to an opposing second component second end 216. The first component mating end 208 and the second component mating end 214 each include attachment flanges. In particular, the first component 202 has a plurality of internal attachment flanges 218 that are spaced evenly around the first component mating end 208, and the second component 204 has a plurality of external attachment flanges 222 that are spaced evenly around the second component mating end 214. Although not depicted as such, it will be appreciated that either, or both, of the first and second component second ends 212, 216 may, if needed, include internal or external attachment flanges 218, 222.

Figure 3:
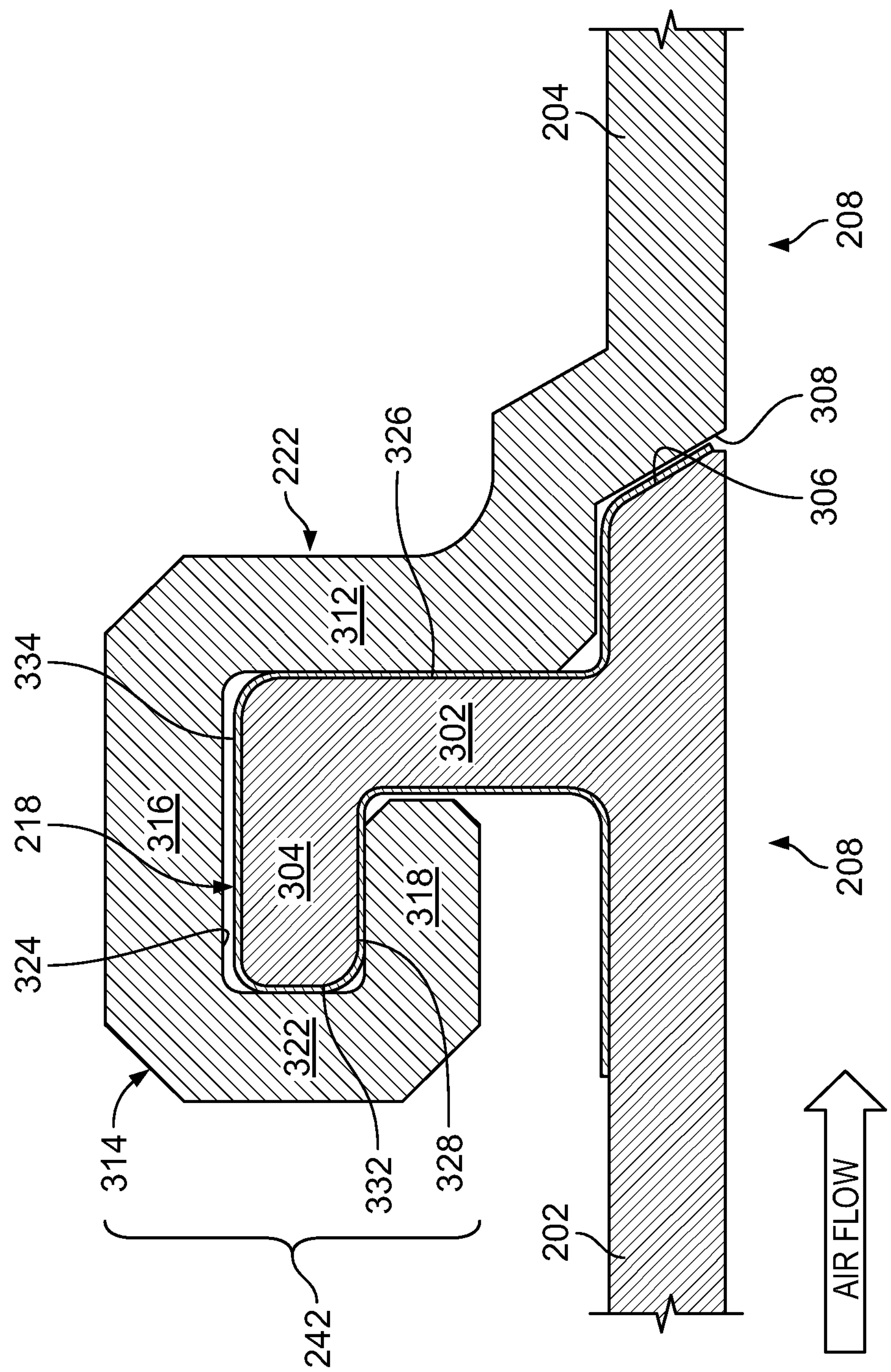
FIG. 3 depicts a close-up cross-sectional view of portions of the two turbomachine components of FIG. 2 showing details of one embodiment of the attachment flanges used for coupling the two turbomachine components.

As shown more clearly in FIG. 3, each internal attachment flange 218 includes a first component flange section 302 and a mating section 304 that is coupled to the first component flange section 302. Each first component flange section 302 extends radially from the first component mating end 208 and is disposed perpendicular to the axis of symmetry 206. Each mating section 304 is spaced apart from the first component mating end 208 and extends parallel to the axis of symmetry 206. In some embodiments, such as the one depicted herein, the first component mating end 208 and the second component mating end 214 may each include conically shaped portions 306, 308, which engage each other and allow high-speed air to flow from the first component 202 into the second component 204 with minimal turbulence.

Each external attachment flange 222 includes a second component flange section 312 and a receptacle section 314. Each second component flange section 312 extends radially from the second component mating end 214 and is disposed perpendicular to the axis of symmetry 206. Each receptacle section 314 includes a first arm 316, a second arm 318, and a third arm 322 that is connected to the first and second arms 316, 318. The first and second arms 316, 318 of each receptacle section 314 extend parallel to the axis of symmetry 206 and are spaced apart from each other, and the third arm 322 of each receptacle section 314 extends perpendicular to the axis of symmetry 206. As such, each receptacle section 314 defines a receptacle section cavity 324 that is dimensioned to receive one of the mating sections 206. Indeed, as FIGS. 2 and 3 clearly depict, the mating section 304 of each internal attachment flange 218 is associated with, and is disposed within, the receptacle section cavity 324 of a different one of the external attachment flanges 222, to thereby define a plurality of mating flange pairs 242.

Figure 4:
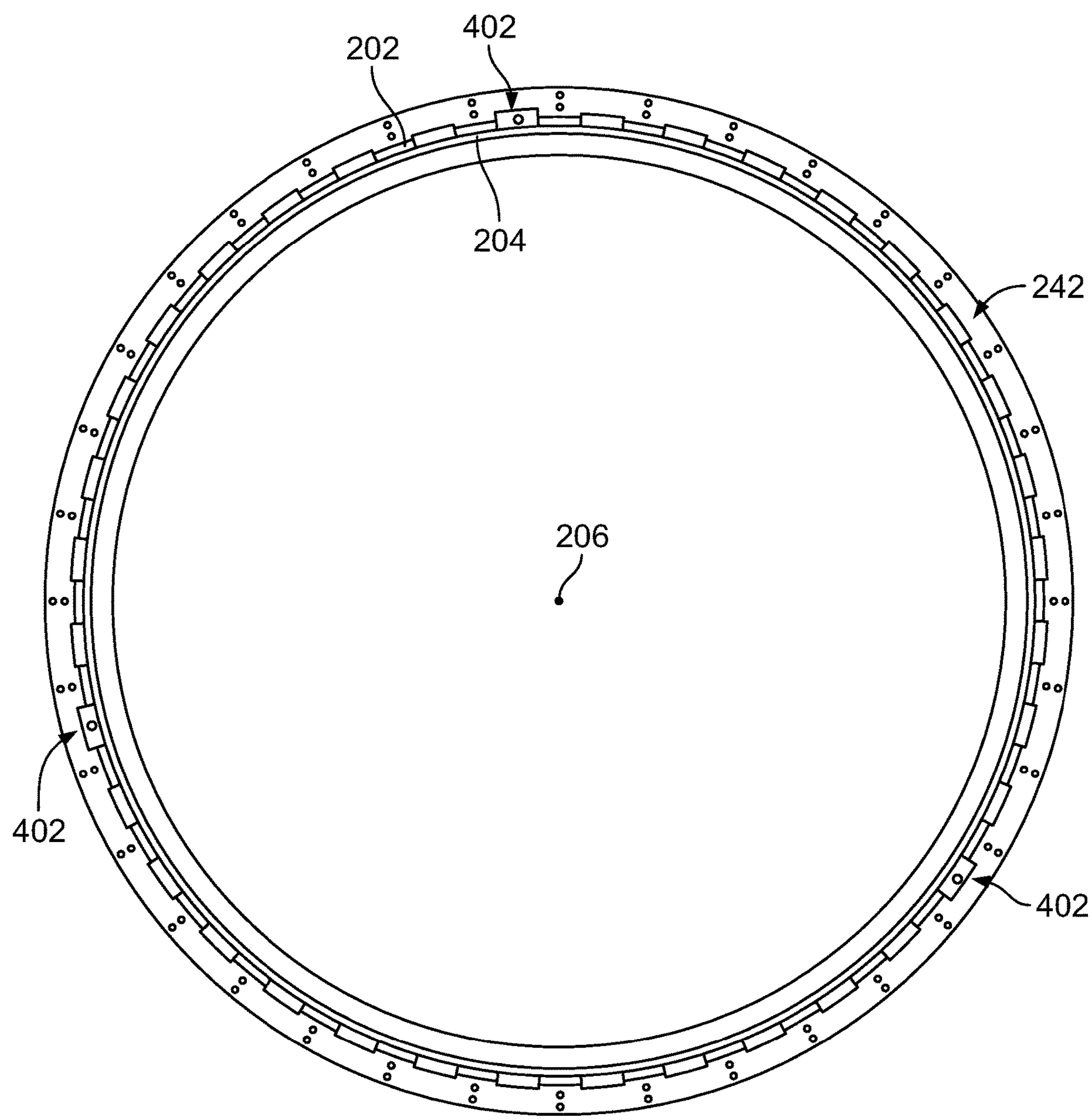
FIG. 4 depicts an end view of the two turbomachine components shown in FIG. 2.

Referring briefly to FIG. 4, which depicts an end view of the first and second components 202, 204 coupled together, it is seen that the illustrated embodiment includes 36 mating flange pairs 242. It will be appreciated that this is merely exemplary, and that the first and second components 202, 204 could be configured to include more or less than this number of mating flange pairs 242.

Returning once again to FIG. 3, it is seen that each first component flange section 302 includes at least a flange section axial pilot face 326, and each mating section 304 includes at least a mating section radial pilot face 328 and a mating section axial pilot face 332. It is additionally seen that each flange section axial pilot face 326 engages its associated second component flange section 312. Moreover, each mating section radial pilot face 328 engages the second arm 318 of its associated external attachment flange 222, and each mating section axial pilot face 332 engages the third arm 322 of it associated external attachment flange 222.

Figure 5:
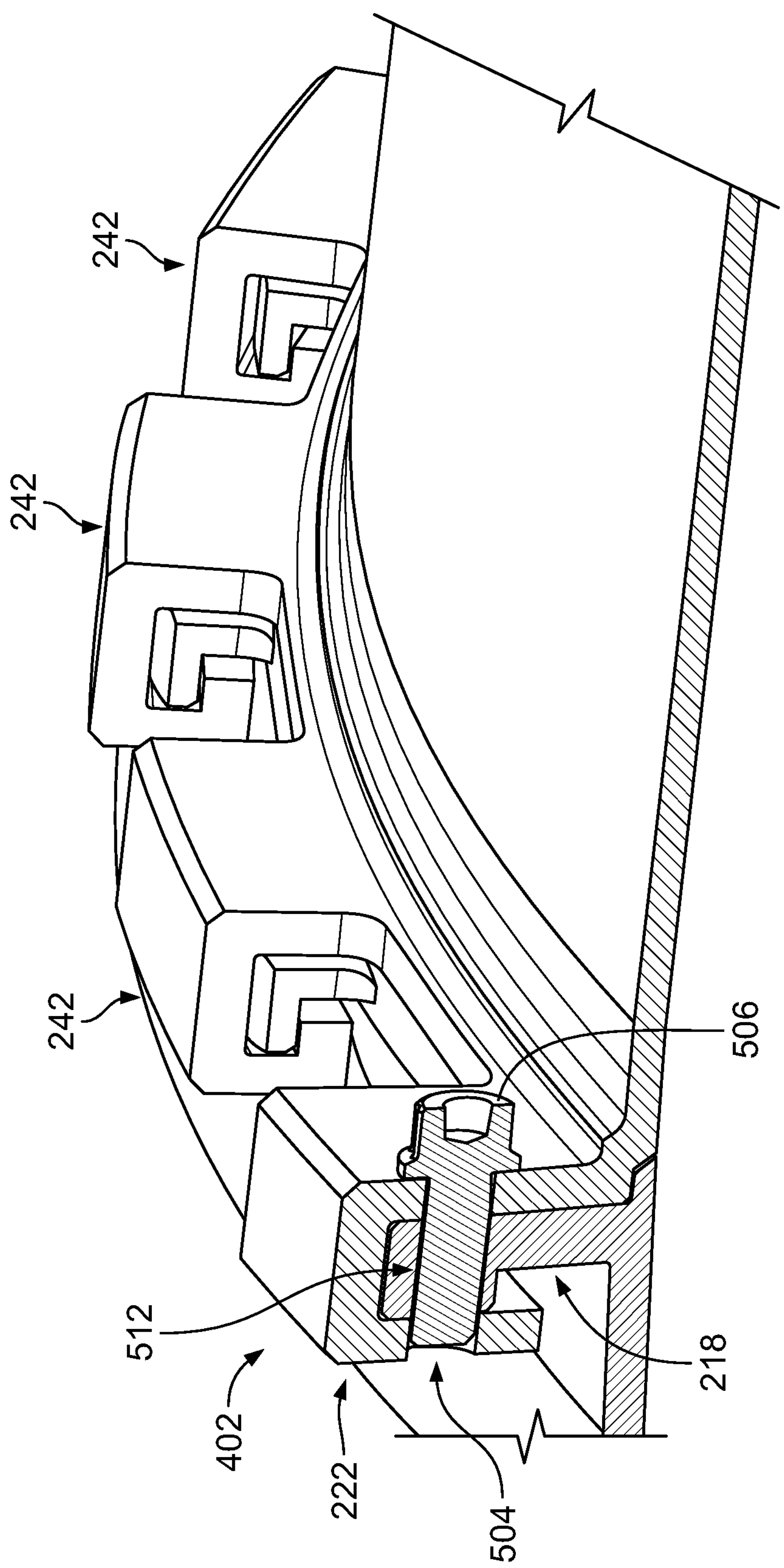
FIG. 5 depicts a partial plan view of a portion of one embodiment of the two turbomachine components of FIG. 2.

When it is desirable to ensure the first and second components 202, 204 can only be coupled together one specific way, the first and second components 202, 204 may additionally be configured such that a subset of the mating flange pairs 242 each includes an anti-rotation feature. This subset of mating flange pairs, as is depicted in FIG. 4, are referred to herein as anti-rotation mating flange pairs 402. More specifically, and as shown more clearly in FIG. 5, a first subset of the internal attachment flanges 218 each include a first anti-rotation feature 502 and a second subset of the external attachment flanges 222 each include a second anti-rotation feature 504. Although the configuration and implementation of the first and second anti-rotation features 502, 504 may vary, in the depicted embodiment, the first and second anti-rotation features 502, 504 each includes a fastener opening. With this configuration, fastener hardware 506, such as a bolt (as shown in FIG. 5) or a bolt and a nut (not shown), may extend through a different one of the anti-rotation mating flange pairs 402.

Preferably, and as FIG. 4 also depicts, the plurality of anti-rotation flange pairs 402 are spaced asymmetrically about the axis of symmetry 206. More specifically, if there are two anti-rotation mating flange pairs 402, these should not be spaced 180-degrees apart, but should instead be spaced apart by some other angle such as, for example, 170- or 190-degrees. Similarly, if there are three anti-rotation mating flange pairs 402, as depicted in the embodiment in FIG. 4, these features should not be spaced 120-degrees apart. Instead, these features should be spaced apart by some other angle such as, for example, 110- or 130-degrees. In addition to ensuring the first and second components 202, 204 can only be coupled together one specific way, the spacing of the anti-rotation mating flange pairs 402 can be strategically located, away from high congestion areas, such as a gearbox, to allow easier assembly.

Figure 6:
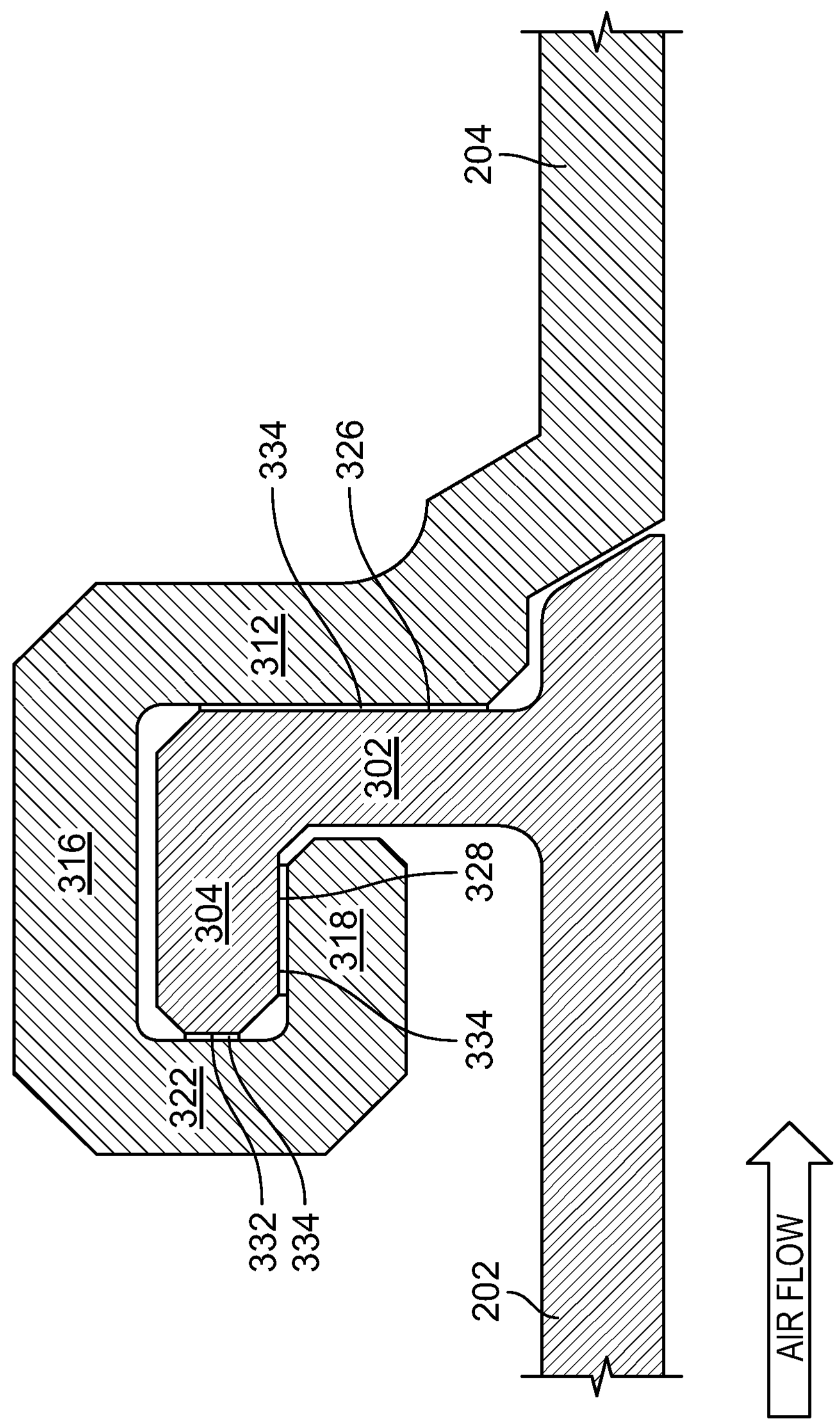
FIG. 6 depicts a close-up cross-sectional view of portions of the two turbomachine components of FIG. 2 showing details of another embodiment of the attachment flanges used for coupling the two turbomachine components.

Referring now to FIG. 6, it is seen that the particular shapes of portions of the internal attachment flanges 218 may vary. In particular, at least in the embodiment depicted therein, portions of the first component flange section 302 and/or portions of the mating section 304 may be chamfered and/or beveled. It will additionally be appreciated that, although in the embodiments depicted in at least FIGS. 3 and 6 the first component 202 is disposed upstream of the second component 204, this need not always be the case. Indeed, in alternative embodiments, such as the one depicted in FIG. 7, the first component 202 may be disposed downstream of the second component 204.

Figure 7:
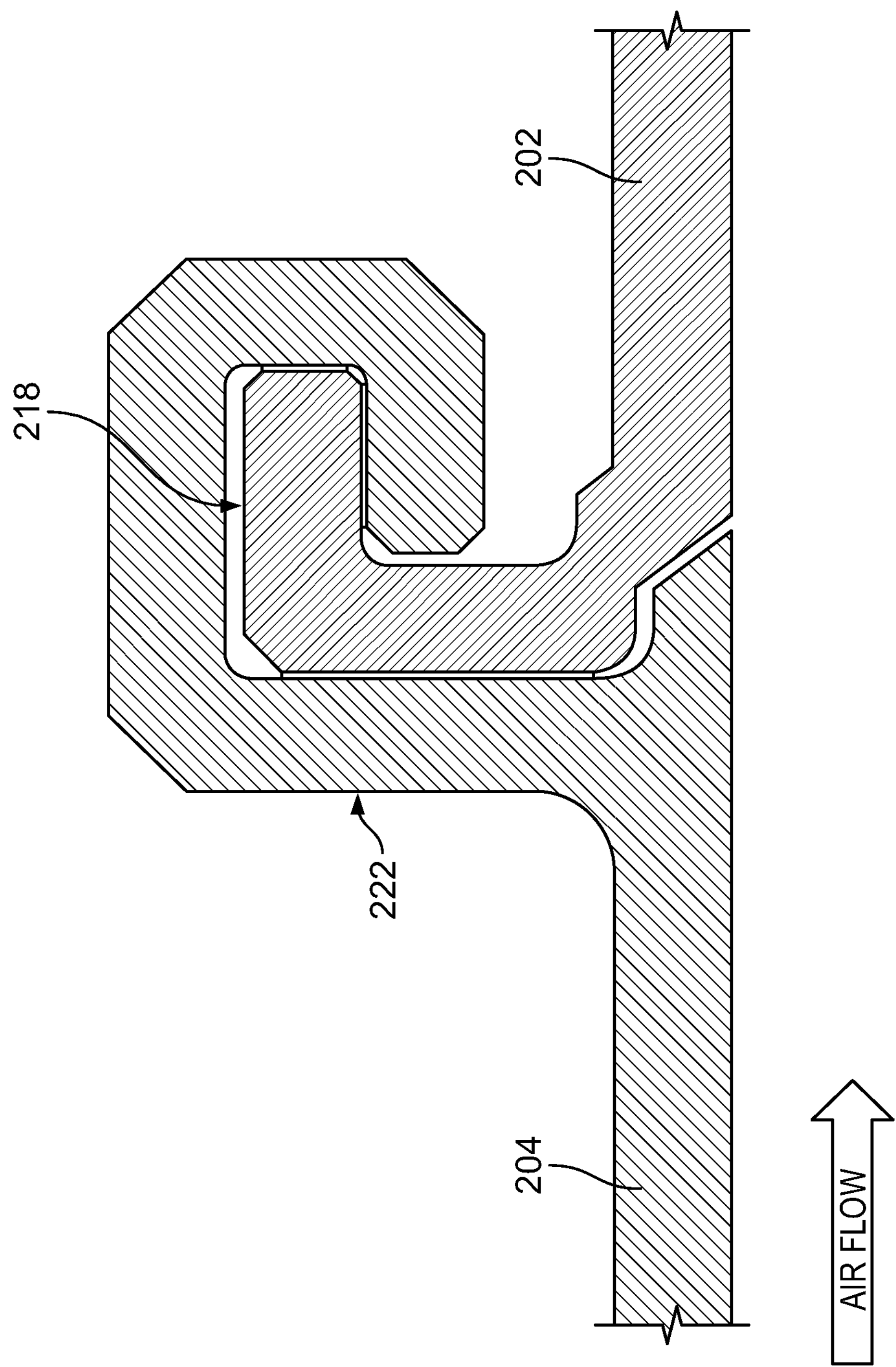
FIG. 7 depicts another arrangement of the two turbomachine components of FIG. 2.

One example method of assembling the first and second components 202, 204 will be described momentarily. Before doing so, it may be appreciated that, at least in some embodiments, the internal and/or external attachment flanges 218, 222 may be implemented with one or more features to facilitate the assembly process. For example, as FIGS. 3, 6, and 7 depict, at least a portion (or all) of each flange section axial pilot face 326, at least a portion (or all) of each mating section radial pilot face 328, and at least a portion (or all) of each mating section axial pilot face 332 may be coated with a low-friction material 334. In some embodiments, at least a portion of the first component mating end 306 may also be coated with the low-friction material 334. The particular low friction material may vary. In one embodiment, it is a material that comprises polytetrafluoroethylene (PTFE) (e.g., an impregnated PTFE material). In other embodiments the low-friction material 334 may be anodizing, chromate conversion, polished surfaces, and dry film lubrication, just to name a few.

Figure 8:
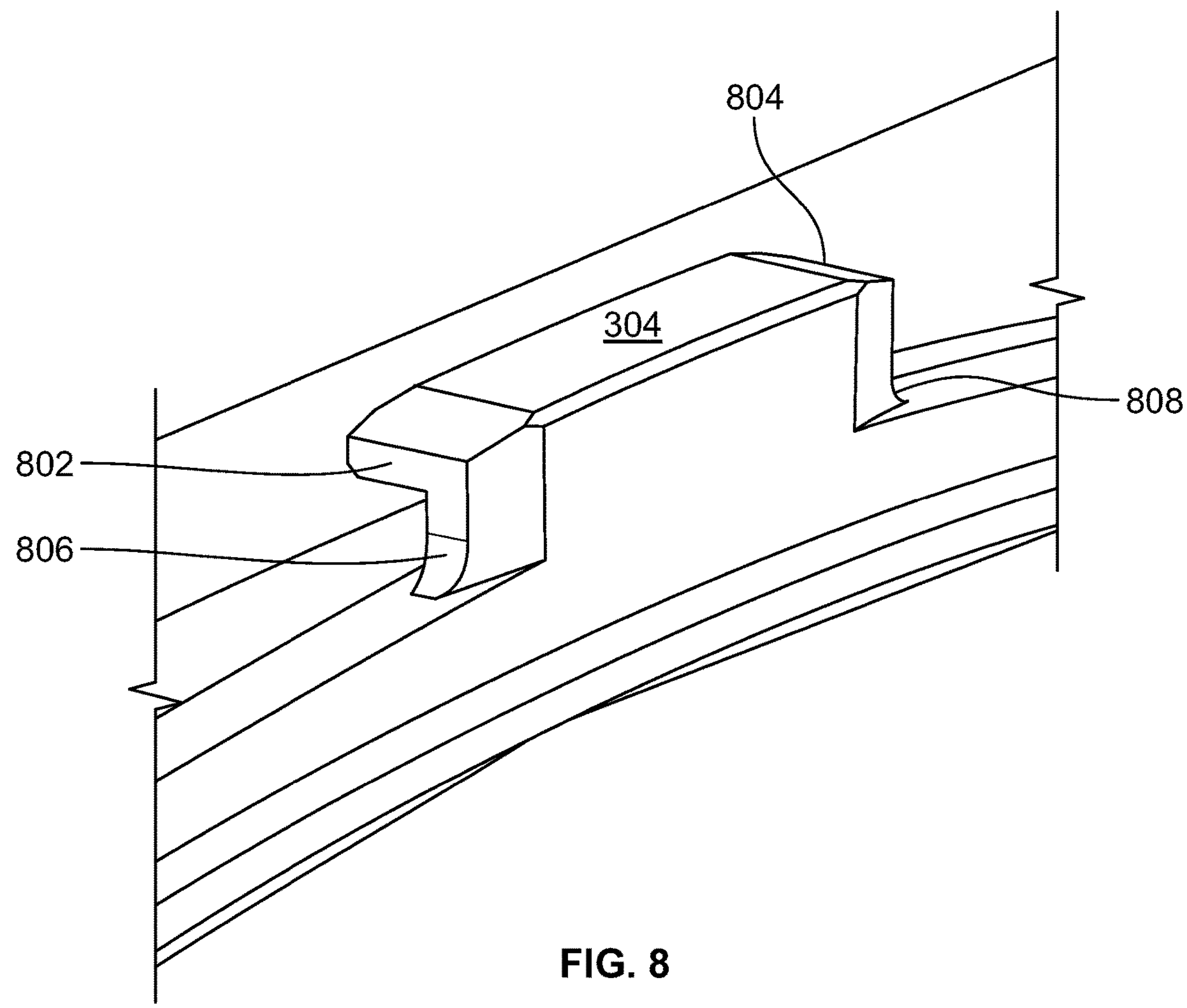
FIGS. 8 and 9 depicts some physical features of the internal attachment flanges that may facilitate the assembly process of the two turbomachine components.
Figure 9:
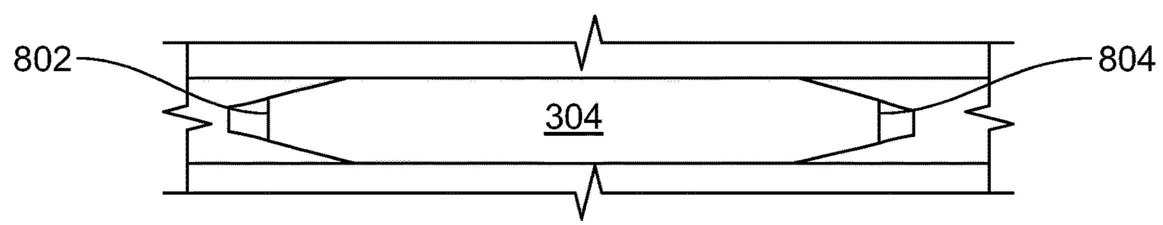

Another technique to facilitate the assembly process is depicted in FIGS. 8 and 9. As depicted therein, it is seen that at least the mating section 304 of each internal attachment flange 218 may include a double chamfered first end 802 and a double chamfered second end 804. In some embodiments, such as the one depicted in FIG. 8, first and second ends 806, 808 of the first component flange section 302 may also include chamfers.

Figure 10:
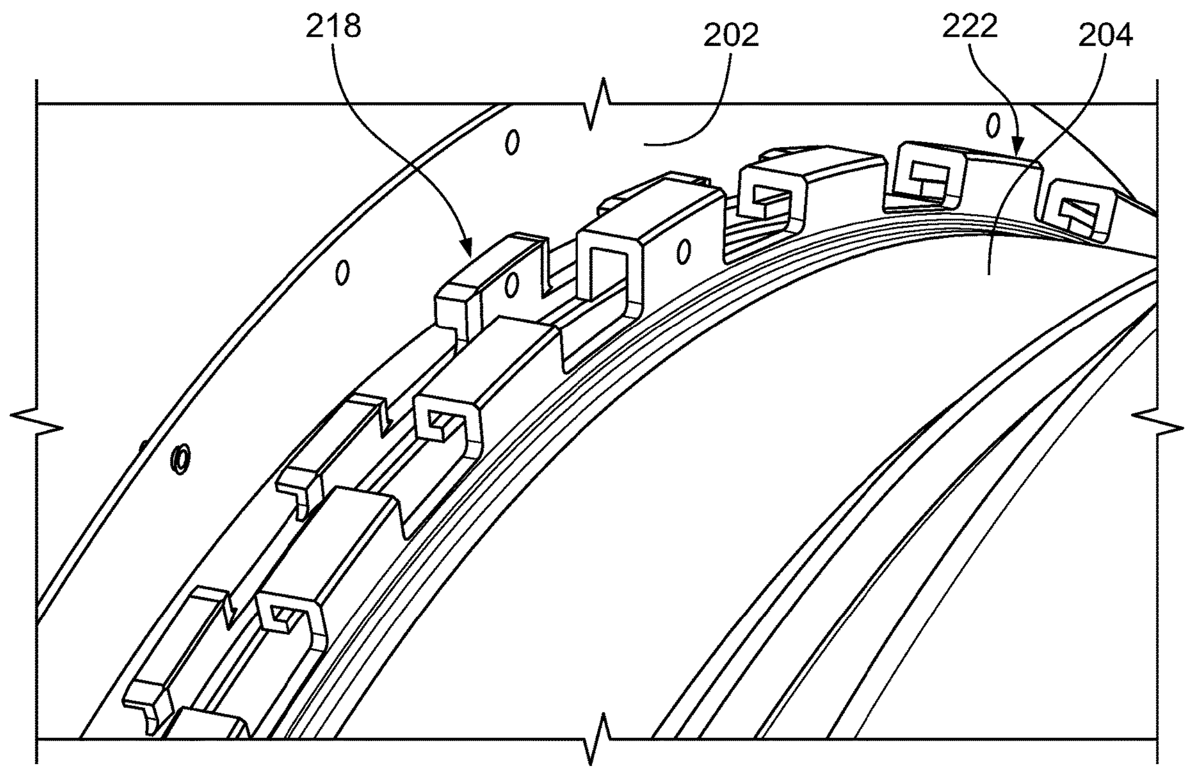
FIGS. 10-12 illustrate the one embodiment of an assembly process for coupling together the two turbomachine components.
Figure 11:
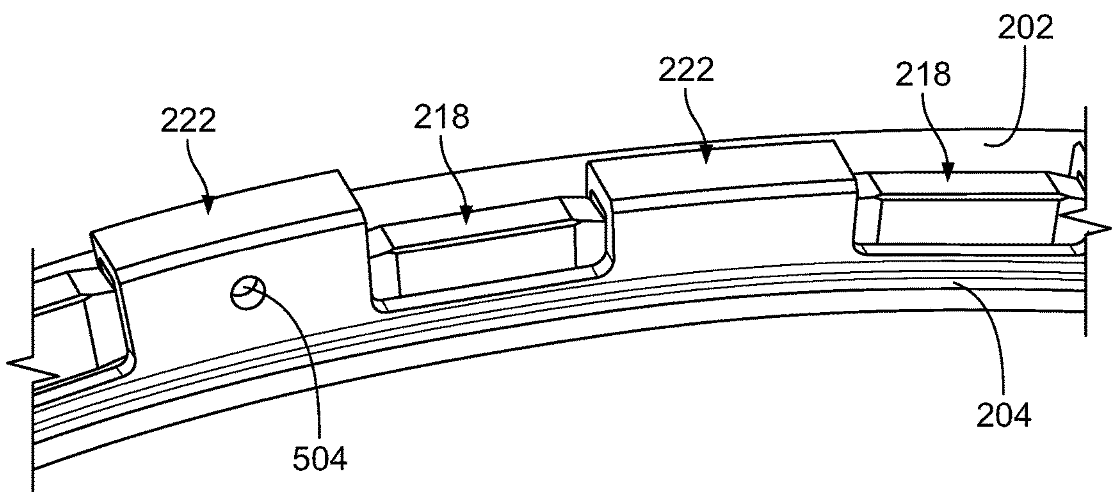
Figure 12:
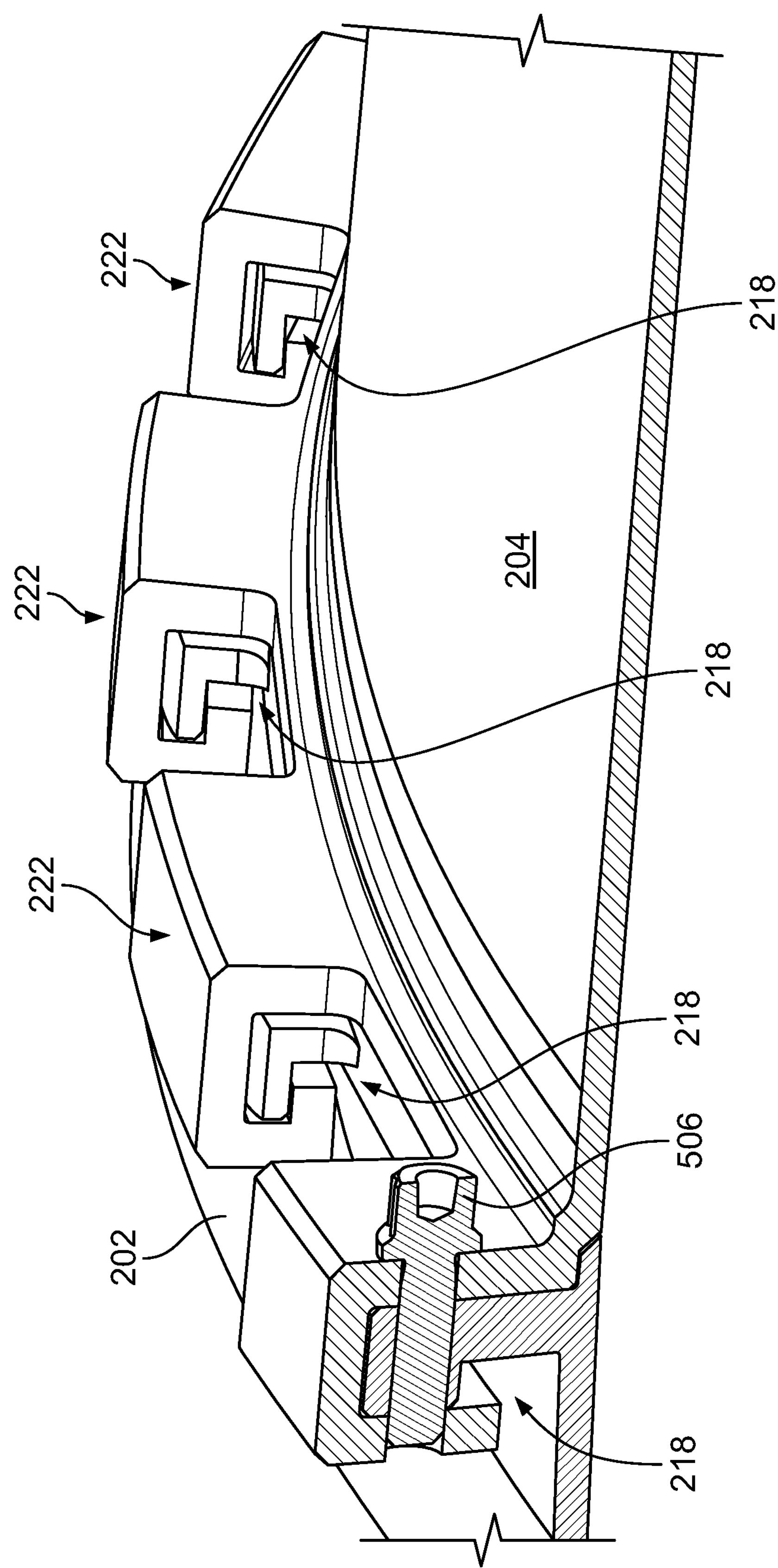

With reference now to FIGS. 10-12, one example method of assembling the first and second components 202, 204 will now be described. Initially, as depicted in FIG. 10, the first and second components 202, 204 having the plurality of internal attachment flanges 218 and plurality of external attachment flanges 222, respectively, are provided. The first and second component mating ends 306, 308 are then abutted, as shown in FIG. 11, in a manner that (i) each internal attachment flange 218 is radially disposed between two adjacent external attachment flanges 222 and (ii) each internal attachment flange 218 that includes a first anti-rotation feature 502 is radially disposed adjacent one of the external attachment flanges 222 that includes a second anti-rotation feature 504. Thereafter, relative rotation is provided between the first component 202 and the second component 204. The relative rotation may be provided by rotating only the first component 202, rotating only the second component 204, or rotating both the first component and the second component 204.

Regardless of how the relative rotation is provided, it continues, as depicted in FIG. 12, until the mating section 304 of each internal attachment flange 218 is disposed within the receptacle section cavity 324 of one of the two adjacent external attachment flanges 222, and such that each of the first anti-rotation features 502 is aligned with a different one of the second anti-rotation features 504. As FIG. 12 also depicts, when the first and second anti-rotation features 502, 504 are implemented as fastener openings, fastener hardware 506 may then be extended through each fastener opening.

Figure 13:
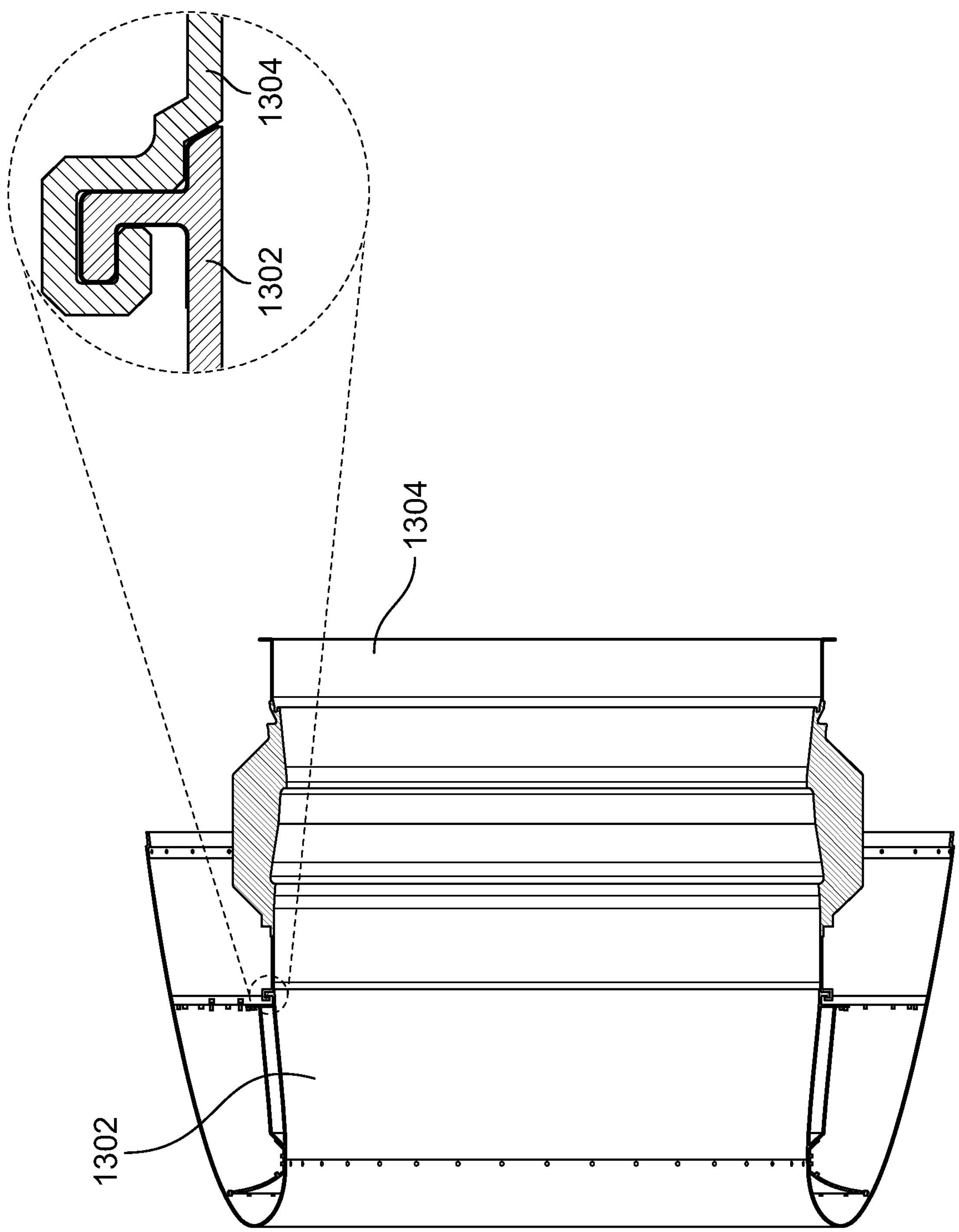
FIG. 13 depicts one example of actual physical turbomachine components being coupled together according to the current disclosure.
Figure 14:
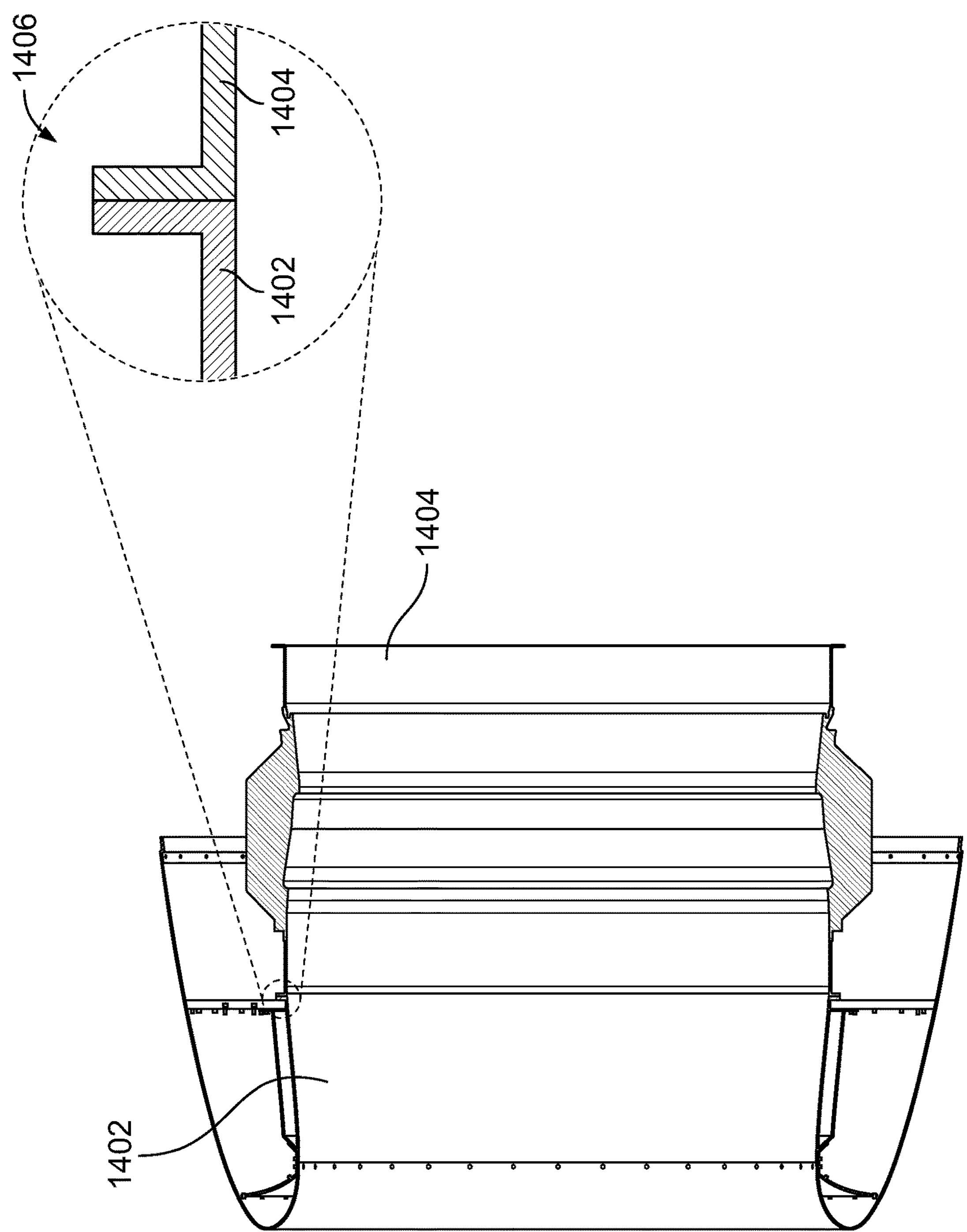
FIG. 14 depicts the actual physical turbomachine components of FIG. 13 being coupled together according to presently known structures and methods.

The turbomachine components and coupling methods do not rely on a time-consuming process of installing fastener hardware at each mating interface flange and/or does not limit the clocking of certain components, such as thrust reverser components. For example, to illustrate this, FIG. 13 depicts an embodiment in which the first structure corresponds to a nacelle inlet structure 1302 and the second structure corresponds to a fan inlet containment housing 1304. With the currently known components and coupling methods, which is depicted in FIG. 14, fastener hardware (not illustrated) must be installed at each mating flange interface 1406 for these components 1402, 1404. The castellated flanges depicted and described herein also provide an improved retention method for retaining the nacelle inlet to the fan containment housing in the event of a "fan blade loss rotating unbalance loading" enabling the flanges to remain intact and not lose an inlet assembly during or subsequent to the event, and is far superior in retention than bolts and nuts for massive unbalance loading.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% of a value to account for manufacturing tolerances.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbomachine, comprising:

a first component that extends about an axis of symmetry from a first component mating end to an opposing first component second end, the first component having a plurality of internal attachment flanges spaced evenly around the first component mating end, each internal attachment flange including a first component flange section and a mating section coupled to the first component flange section, each first component flange section extending radially from the first component mating end and disposed perpendicular to the axis of symmetry, each mating section spaced apart from the first component mating end and extending parallel to the axis of symmetry; and a second component that extends about the axis of symmetry from a second component mating end to an opposing second component second end, the second component coupled to the first component and having a plurality of external attachment flanges spaced evenly around the second component mating end, each external attachment flange including a second component flange section and a receptacle section, each second component flange section extending radially from the second component mating end and disposed perpendicular to the axis of symmetry, each receptacle section including a first arm, a second arm, and a third arm that is connected to the first and second arms, wherein the first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections, wherein:

the mating section of each internal attachment flange is associated with, and is disposed within, the receptacle section cavity of a different one of the external attachment flanges, to thereby define a plurality of mating flange pairs, and a subset of the mating flange pairs each includes an anti-rotation feature, to thereby define a plurality of anti-rotation mating flange pairs.

2. The turbomachine of claim 1, further comprising:

a plurality of fastener hardware, each fastener hardware extending through a different one of the anti-rotation mating flange pairs.

3. The turbomachine of claim 1, wherein the plurality of anti-rotation flange pairs are spaced asymmetrically about the axis of symmetry.

4. The turbomachine of claim 1, wherein:

each first component flange section includes a flange section axial pilot face; and each mating section includes at least a mating section radial pilot face and a mating section axial pilot face.

5. The turbomachine of claim 4, wherein:

each flange section axial pilot face engages its associated second component flange section;

each mating section radial pilot face engages the second arm of its associated external attachment flange; and each mating section axial pilot face engages the third arm of it associated external attachment flange.

6. The turbomachine of claim 5, wherein at least a portion of each flange section axial pilot face, at least a portion of each mating section radial pilot face, and at least a portion of each mating section axial pilot face are coated with a material that comprises polytetrafluoroethylene (PTFE).

7. The turbomachine of claim 6, wherein at least a portion of the first component mating end is coated with the material that comprises PTFE.

8. The turbomachine of claim 1, wherein:

the first component mating end and the second component mating end each include conically shaped portions; and the conically shaped portions of the first component mating end and the second component mating end engage each other.

9. The turbomachine of claim 1, wherein the mating section of each internal attachment flange includes a double chamfered first end and a double chamfered second end.

10. The turbomachine of claim 9, wherein the first component flange section of each internal attachment flange includes at least a partially chamfered first end and a partially chamfered second end.

11. A turbomachine, comprising:

a first component that extends about an axis of symmetry from a first component mating end to an opposing first component second end, the first component having a plurality of internal attachment flanges spaced evenly around the first component mating end, each internal attachment flange including a first component flange section and a mating section coupled to the first component flange section, each first component flange section extending radially from the first component mating end and disposed perpendicular to the axis of symmetry, each mating section spaced apart from the first component mating end and extending parallel to the axis of symmetry; and a second component that extends about the axis of symmetry from a second component mating end to an opposing second component second end, the second component coupled to the first component and having a plurality of external attachment flanges spaced evenly around the second component mating end, each external attachment flange including a second component flange section and a receptacle section, each second component flange section extending radially from the second component mating end and disposed perpendicular to the axis of symmetry, each receptacle section including a first arm, a second arm, and a third arm that is connected to the first and second arms, wherein the first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections, wherein:

each mating section is associated with, and is disposed within, the receptacle section cavity of a different one of the external attachment flanges, to thereby define a plurality of mating flange pairs, a subset of the mating flange pairs each includes an anti-rotation feature, to thereby define a plurality of anti-rotation mating flange pairs, each anti-rotation mating flange pair has fastener hardware that extends therethrough, and the plurality of anti-rotation mating flange pairs are spaced asymmetrically about the axis of symmetry.

12. The turbomachine of claim 11, wherein:

each first component flange section includes a flange section axial pilot face; and each mating section includes at least a mating section radial pilot face and a mating section axial pilot face.

13. The turbomachine of claim 12, wherein:

each flange section axial pilot face engages its associated second component flange section;

each mating section radial pilot face engages the second arm of its associated external attachment flange; and each mating section axial pilot face engages the third arm of it associated external attachment flange.

14. The turbomachine of claim 13, wherein at least a portion of each flange section axial pilot face, at least a portion of each mating section radial pilot face, and at least a portion of each mating section axial pilot face are coated with a material that is impregnated with polytetrafluoroethylene (PTFE).

15. The turbomachine of claim 14, wherein at least a portion of the first component mating end is coated with the material that comprises PTFE.

16. The turbomachine of claim 11, wherein:

the first component mating end and the second component mating end each include conically shaped portions; and the conically shaped portions of the first component mating end and the second component mating end engage each other.

17. The turbomachine of claim 11, wherein:

the mating section of each internal attachment flange includes a double chamfered first end and a double chamfered second end; and the first component flange section of each internal attachment flange includes at least a partially chamfered first end and a partially chamfered second end.

18. A method of coupling together two turbomachine components, comprising the steps of:

providing a first component that extends about an axis of symmetry from a first component mating end to an opposing first component second end, the first component having a plurality of internal attachment flanges spaced evenly around the first component mating end, each internal attachment flange including a first component flange section and a mating section coupled to the first component flange section, each first component flange section extending radially from the first component mating end and disposed perpendicular to the axis of symmetry, each mating section spaced apart from the first component mating end and extending parallel to the axis of symmetry, wherein a first subset of the internal attachment flanges each include a first anti-rotation feature;

providing a second component that extends about the axis of symmetry from a second component mating end to an opposing second component second end, the second component having a plurality of external attachment flanges spaced evenly around the second component mating end, each external attachment flange including a second component flange section and a receptacle section, each second component flange section extending radially from the second component mating end and disposed perpendicular to the axis of symmetry, each receptacle section including a first arm, a second arm, and a third arm that is connected to the first and second arms, wherein the first and second arms of each receptacle section extend parallel to the axis of symmetry and are spaced apart from each other, and the third arm of each receptacle section extends perpendicular to the axis of symmetry, whereby each receptacle section defines a receptacle section cavity dimensioned to receive one of the mating sections, wherein a second subset of the external attachment flanges each include a second anti-rotation feature;

abutting the first component mating end and the second component mating end in a manner that (i) each internal attachment flange is radially disposed between two adjacent external attachment flanges and (ii) each internal attachment flange that includes a first anti-rotation feature is radially disposed adjacent one of the external attachment flanges that includes a second anti-rotation feature; and providing relative rotation between the first component and the second component until the mating section of each internal attachment flange is disposed within the receptacle section cavity of one of the two adjacent external attachment flanges, and such that each of the first anti-rotation features is aligned with a different one of the second anti-rotation features.

19. The method of claim 18, wherein:

each first anti-rotation feature and each second anti-rotation features includes a fastener opening; and the method further comprises extending fastener hardware through each fastener opening.

20. The method of claim 18, wherein the step of providing a first component comprises:

anodizing at least a portion of each internal attachment flange with a material impregnated with polytetrafluoroethylene (PTFE).

* * * * *